United States Patent
Buehlmeyer et al.

(10) Patent No.: US 8,998,335 B2
(45) Date of Patent: *Apr. 7, 2015

(54) VEHICLE SEAT AND COMMERCIAL VEHICLE

(71) Applicant: Grammer AG, Amberg (DE)

(72) Inventors: Katja Buehlmeyer, Kuemmersbruck (DE); Erwin Haller, Birgland (DE); Jens Kolb, Koenigstein (DE); Roland Uebelacker, Pfreimd (DE); Hermann Meiller, Wernberg-Koeblitz (DE)

(73) Assignee: Grammer AG, Amberg, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/686,409

(22) Filed: Nov. 27, 2012

(65) Prior Publication Data

US 2013/0134753 A1     May 30, 2013

(30) Foreign Application Priority Data

Nov. 30, 2011 (DE) .......................... 10 2011 055 895
Nov. 30, 2011 (DE) .......................... 10 2011 055 897

(51) Int. Cl.
*A47C 1/10* (2006.01)
*A47C 7/36* (2006.01)
(Continued)

(52) U.S. Cl.
CPC .. *B60N 2/38* (2013.01); *B60N 2/64* (2013.01); *B60N 2/4808* (2013.01); *B60N 2/2222* (2013.01)

(58) Field of Classification Search
USPC ......... 297/407, 408, 406, 397, 396, 398, 383, 297/242, 337
See application file for complete search history.

(56) References Cited

U.S. PATENT DOCUMENTS

| 937,343 A | 10/1909 | Wallace |
| 1,257,427 A | 2/1918 | Underwood |

(Continued)

FOREIGN PATENT DOCUMENTS

| AT | 321497 | 4/1975 |
| DE | 1796557 | 9/1959 |

(Continued)

OTHER PUBLICATIONS

Examination Report prepared by the German Patent Office for Application No. 10 2011 055 597.7, dated Feb. 27, 2012.

(Continued)

*Primary Examiner* — Chi Q Nguyen
(74) *Attorney, Agent, or Firm* — Sheridan Ross P.C.

(57) ABSTRACT

The invention relates to a vehicle seat with a seat part and with a seat back part for supporting a driver of the vehicle in the sitting position on the vehicle seat, wherein the vehicle seat has an additional vehicle driver's torso support device which can be disposed outside the seat part and the seat back and which can be temporarily disposed at least partially in an otherwise seat-free torso support region in front of the seat back part and laterally and/or above the seat back part, in order to provide support, laterally off-center of the seat back part, at least at the level of the shoulder region of the driver who is sitting on the vehicle seat when he adopts a seated working posture oriented to the side or backwards, and wherein the additional vehicle driver's torso support device comprises a seat back extension device which is disposed on the seat back part (3) so as to be movable in translation along a horizontal axis in order to be able to move the additional vehicle driver's torso support device substantially horizontally from an approximately central starting position into an off-center additional torso support position.

18 Claims, 2 Drawing Sheets

(51) Int. Cl.
*A61G 15/00* (2006.01)
*B60R 22/28* (2006.01)
*B60N 2/38* (2006.01)
*B60N 2/64* (2006.01)
*B60N 2/48* (2006.01)
*B60N 2/22* (2006.01)

(56) References Cited

U.S. PATENT DOCUMENTS

| | | | | |
|---|---|---|---|---|
| 2,835,311 | A | * | 5/1958 | Reeves et al. ............ 297/230.11 |
| 3,300,249 | A | * | 1/1967 | Schneider ..................... 297/408 |
| 3,342,528 | A | | 9/1967 | Radke et al. |
| 3,393,938 | A | | 7/1968 | Meyer et. al. |
| 4,108,493 | A | | 8/1978 | Naus |
| 4,195,882 | A | | 4/1980 | Daswick |
| 4,634,176 | A | * | 1/1987 | Scott ........................... 297/284.5 |
| 5,108,150 | A | | 4/1992 | Stas |
| 5,154,477 | A | * | 10/1992 | Lacy ............................. 297/397 |
| 5,211,696 | A | * | 5/1993 | Lacy ............................. 297/397 |
| 5,803,542 | A | * | 9/1998 | Insausti ......................... 297/256 |
| 6,079,784 | A | * | 6/2000 | Peachey ...................... 297/284.5 |
| 6,305,749 | B1 | * | 10/2001 | O'Connor et al. ............. 297/397 |
| 6,513,781 | B1 | * | 2/2003 | Meyer et al. .................. 248/544 |
| 6,648,416 | B2 | * | 11/2003 | O'Connor et al. ............. 297/397 |
| 6,893,095 | B2 | | 5/2005 | Schambre et al. |
| 7,178,874 | B2 | * | 2/2007 | Demski ......................... 297/391 |
| 2003/0155797 | A1 | * | 8/2003 | Amirault et al. ........... 297/250.1 |

FOREIGN PATENT DOCUMENTS

| | | |
|---|---|---|
| DE | 7228055 | 11/1972 |
| DE | 26 44 485 A1 | 4/1978 |
| DE | 2644485 | 4/1978 |
| DE | 30 46 049 A1 | 7/1982 |
| DE | 3046049 | 7/1982 |
| DE | 4126518 | 2/1993 |
| DE | 42 15 628 A1 | 11/1993 |
| DE | 4215628 | 11/1993 |
| DE | 44 05 397 C1 | 3/1995 |
| DE | 4405397 | 3/1995 |
| DE | 19937378 | 7/2000 |
| DE | 199 20 220 A1 | 11/2000 |
| DE | 19920220 | 11/2000 |
| DE | 20307102 | 10/2003 |
| DE | 69913203 | 9/2004 |
| DE | 60116924 | 11/2006 |
| DE | 102006028453 | 12/2007 |
| DE | 102007044319 | 7/2008 |
| DE | 102007012133 | 9/2008 |
| DE | 202007016357 | 3/2009 |
| DE | 102010009526 | 8/2011 |
| DE | 102011055895 | 6/2013 |
| EP | 0972671 | 1/2000 |
| EP | 2599658 | 6/2013 |
| FR | 2 748 432 | 11/1997 |
| FR | 2748432 | 11/1997 |
| FR | 2 895 336 A1 | 6/2007 |
| FR | 2895336 | 6/2007 |
| FR | 2927855 | 8/2009 |
| FR | 2 930 208 A1 | 10/2009 |
| FR | 2929185 | 10/2009 |
| FR | 2930208 | 10/2009 |
| FR | 2 932 429 A1 | 12/2009 |
| FR | 2932429 | 12/2009 |
| GB | 2277869 | 11/1994 |
| GB | 2 453 165 A | 4/2009 |
| GB | 2453165 | 4/2009 |
| GB | 2472836 | 2/2011 |
| WO | WO 2003/068556 | 8/2003 |
| WO | WO 2011/020919 | 2/2011 |
| WO | WO 2011/020919 A1 | 2/2011 |

OTHER PUBLICATIONS

U.S. Appl. No. 13/686,377, Buehlmeyer et al.
U.S. Appl. No. 13/691,055, Buehlmeyer et al.
Extended European Search Report for European Patent Application No. 12194405.2, mailed Feb. 8, 2013, 3 pages.
Examination Report for German Patent Application No. 102011055895.0, dated Feb. 29, 2012, 3 pages.
Examination Report for German Patent Application No. 102011055895.0, dated Oct. 2, 2012, 3 pages.
Examination Report for German Patent Application No. 102011055897.7, dated Feb. 27, 2012, 3 pages.
Official Action (no English translation available) for German Patent Application No. 102013110445.2 dated Mar. 10, 2014, 3 pages.
Official Action (no English translation available) for German Patent Application No. 102013110448.7 dated Mar. 10, 2014, 3 pages.
Official Action (no English translation available) for German Patent Application No. 102013110416.9 dated Mar. 7, 2014, 3 pages.
Examination Report for German Patent Application No. 102010018822.0, dated Jan. 31, 2013, 3 pages.
Extended European Search Report for European Patent Application No. 12194557, mailed Feb. 7, 2013, 3 pages.
Official Action for German Patent Application No. 102012104184.9 dated Jan. 21, 2013, 3 pages.
Official Office Action for U.S. Appl. No. 13/686,337 mailed Apr. 24, 2014, 11 pages.
Official Action (with English translation) for Chinese Patent Application No. 2012104992473, dated Nov. 3, 2014, 13 pages.

* cited by examiner

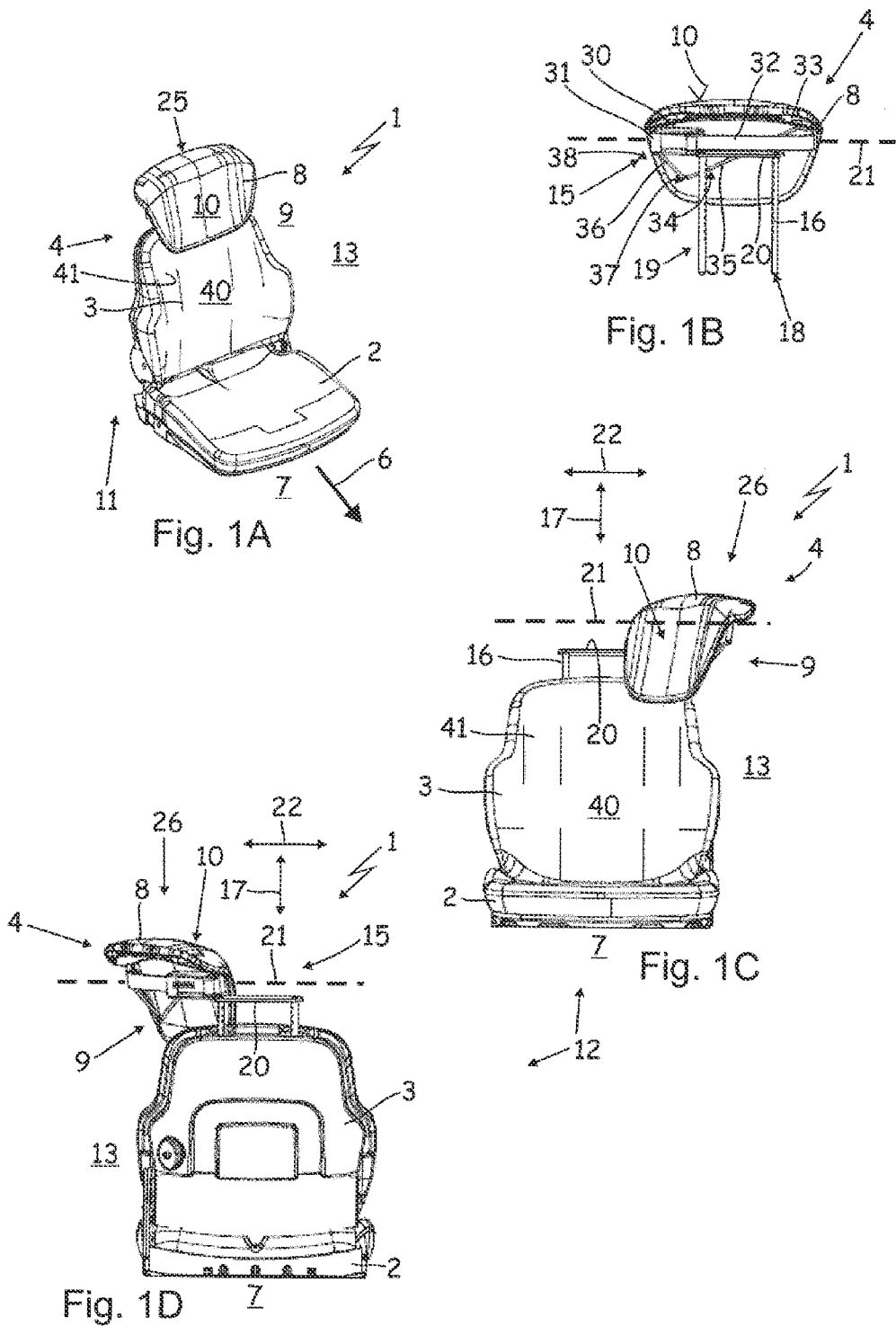

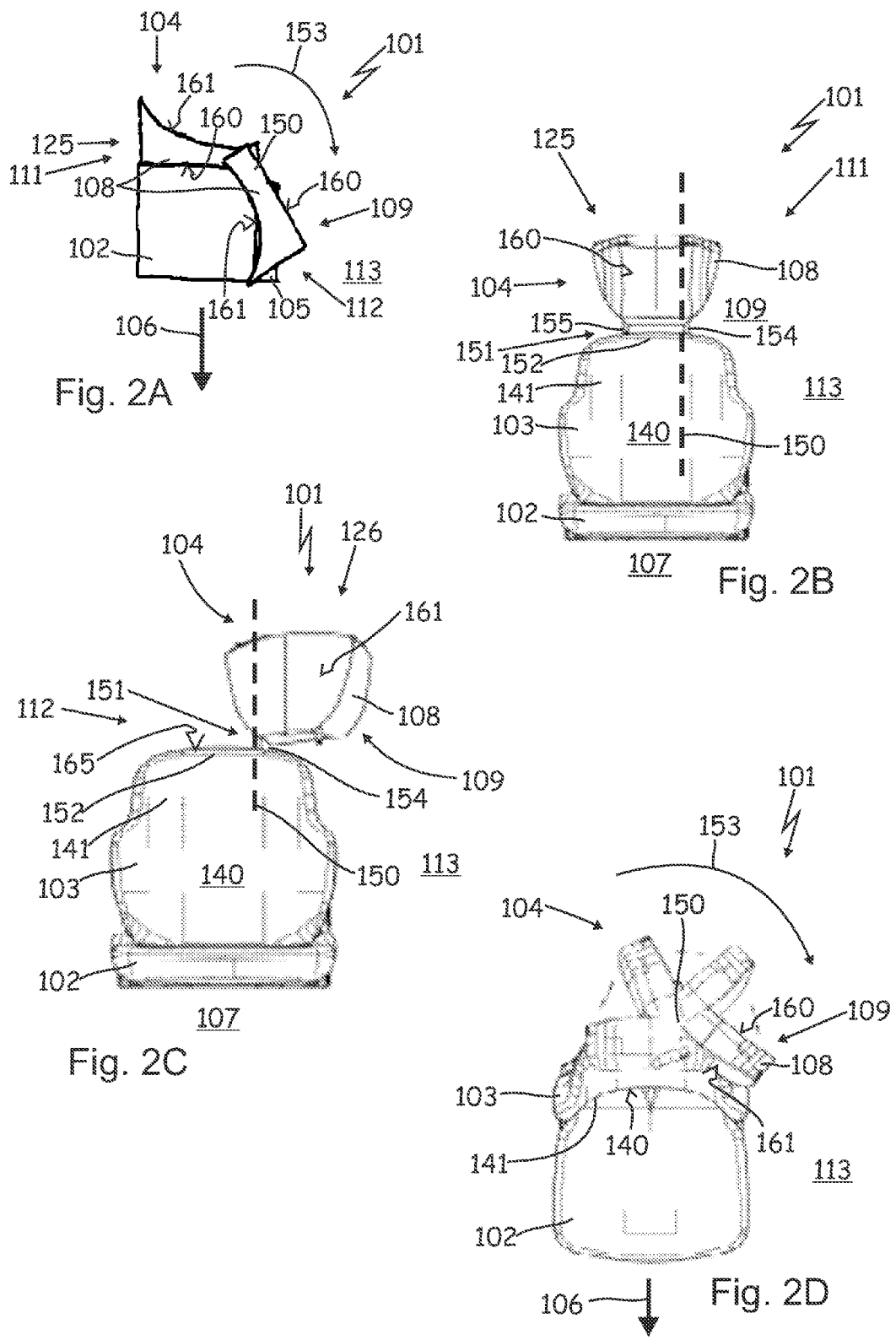

VEHICLE SEAT AND COMMERCIAL VEHICLE

CROSS REFERENCE TO RELATED APPLICATIONS

This application claims the benefit of German Application No. 10 2011 055 897.7, filed Nov. 30, 2011 and German Application No. 10 2011 055 895.0, filed Nov. 30, 2011, the entire disclosure of which is incorporated herein by reference.

BACKGROUND OF THE INVENTION

The invention relates on the one hand to a vehicle seat with a seat part and with a seat back part for supporting a driver of the vehicle in his sitting position on the vehicle seat.

On the other hand the invention relates to a commercial vehicle, in particular an agricultural commercial vehicle, with a vehicle seat for a vehicle driver.

Generic vehicle seats in particular for commercial vehicles and especially for agricultural commercial vehicles are well known in many forms from the prior art.

In particular, while working with these agricultural commercial vehicles and working equipment attached thereto drivers of agricultural commercial vehicles often adopt over a relatively long period of time a seated working posture which is oriented sideways or backwards, in contrast to the normal posture facing forwards in the driving direction, in order for example to be able to reach better and to operate operating elements disposed laterally at the back of the vehicle cab, or also in order to have a good view for a relatively long period of time of a working device attached behind the agricultural commercial vehicle.

A seat with a seat back is known for example from the publication DE 30 46 049 A1, wherein the seat back or at least a seat back extension which forms an upper part of the seat back is rotatable about a vertical axis so that a driver can better reach operating devices disposed to the rear. Due to the rotatable seat back extension these operating devices can in fact be reached better by the driver. However, when the driver is in a working posture oriented backwards, for example when observing working equipment during use in the fields, he cannot be additionally supported since with such off-centre loading the seat back extension would turn back again into its original position.

In more modern vehicles a vehicle driver can currently swivel the entire vehicle seat, that is to say substantially the entire rigid seat construction together with the seat part and the seat back part, with the aid of a rotary adapter about a defined vertical axis of rotation. In this case the seat part remains stationary in relation to the seat back part. On the one hand this results in the driver of the vehicle having to turn out of a comfortable upholstered seat contour of the vehicle seat in order in particular to be able to actuate the pedals of the agricultural commercial vehicle safely. This can lead to pressure sores and thus to discomfort especially in the buttocks and thigh area of the driver of the vehicle.

Any accessories on the vehicle seat, for example a multi-function armrest, likewise rotate in relation thereto. Operating levers which are disposed further back and to the side still cannot always be actuated comfortably.

The upholstered backrest contour is currently shaped in such a way that the driver of the vehicle has the maximum possible support when in the forward facing seated working posture without losing the necessary degrees of freedom required for his movements when driving. In order not to impede freedom of movement in the shoulder and arm region, the backrest cushion of the seat back part should not be contoured too much in the upper region. However, in order to ensure good support and thus a sufficiently good relief of the strain on the driver, a support surface should always be as large as possible. At present, for the reasons mentioned above, such as the necessary degrees of freedom for good movement, this can only be achieved to some extent since the driver alternates between two extremely different driving positions.

A further disadvantage is that the swivel range of the rotary adapter is limited by the fact that in spite of the possibility of watching the working equipment behind the commercial vehicle the vehicle must also be safely controlled by means of the pedals and the steering wheel. In order to meet these requirements the driver of the vehicle must adopt an enforced posture which inevitably leads to twisting of the entire body. Scientific studies show that such a twisted enforced posture in particular with vibrational stresses can lead to damage to the body structures, especially when the body is not sufficiently well supported. It is also established that the strain on the spinal column can be significantly reduced by good support by means of the seat back part.

SUMMARY OF THE INVENTION

The object of the invention is to offer the driver of a vehicle improved seating comfort in order to be able to operate and in particular to drive an agricultural commercial vehicle in a more operationally reliable and safer manner. By relief of stress on the body structures premature fatigue is prevented and thus the working efficiency is increased.

The object of the invention is achieved by a vehicle seat with a seat part and with a seat back part for supporting a driver of the vehicle in the sitting position on the vehicle seat, wherein the vehicle seat has an additional vehicle driver's torso support device which can be disposed outside the seat part and the seat back and which can be temporarily disposed at least partially in an otherwise seat-free torso support region in front of the seat back part and laterally and/or above the seat back part, in order to provide support, laterally off-centre of the seat back part, at least at the level of the shoulder or chest region of the driver who is sitting on the vehicle seat when he adopts a seated working posture oriented to the side or backwards, and wherein the additional vehicle driver's torso support device comprises a seat back extension device which is disposed on the seat back part so as to be movable in translation along a horizontal axis in order to be able to move the additional vehicle driver's torso support device from an approximately central starting position into an off-centre additional torso support position.

When the vehicle driver adopts an enforced posture, in particular the seated working position described above in which he is oriented to the side or backwards, extraordinarily good relief from strain can be provided advantageously by the additional vehicle driver's torso support device disposed in this way. Furthermore, the additional vehicle driver's torso support device is preferably available only when needed. Otherwise, for instance in a forward facing driving position, the additional vehicle driver's torso support does not interfere, since it remains in its starting position in which it is advantageously configured as a seat back extension device.

The additional vehicle driver's torso support device is disposed on the seat back part in order to be able to move the additional vehicle driver's torso support device from an approximately central starting position into an off-centre additional torso support position, so that a working area laterally around the vehicle seat is at least not permanently blocked by the additional vehicle driver's torso support device.

Within the meaning of the invention the expression "seat back extension device" describes an upper part of the seat back part, by means of which the driver of the vehicle can be supported substantially in the region of his torso.

It will be understood, that the seat back extension device can be configured in many different ways. A structurally simple and thus preferred variant provides that the back extension device is configured so that it can simultaneously constitute the additional vehicle driver's torso support device.

Within the meaning of the invention the expression "additional vehicle driver's torso support device" describes a device used only temporarily for additional torso support for the driver of the vehicle while in an enforced posture on the vehicle seat, in particular a working posture oriented to the side or backwards.

In the present context the term "torso" describes anatomically the central region of a human body, and the torso encompasses the chest, the abdomen, the back and the pelvis of the human body.

In this respect it is advantageous if the additional vehicle driver's torso support comprises a contact surface for the vehicle driver's back and/or shoulder region, wherein the contact surface is advantageously ergonomically shaped so as to correspond particularly well to the human body anatomy. This encourages acceptance by the driver. In particular the driver's body is well protected by such a contact surface against injuries, since especially when this is used in agricultural commercial vehicles working on the land the going is often very rough and in this case the driver of the vehicle is grateful for any targeted torso support.

Within the meaning of the invention the expression "seat-free torso support region" describes a region on the vehicle seat in which it is not sensible for permanent torso support devices for the vehicle seat to be permanently disposed, since in normal driving operation this would be very disruptive to the driver of the vehicle. In this case the present seat-free torso support region is located on the one hand substantially in the upper third of the seat back part, that is to say more than halfway up the seat back part, or respectively above an armrest and thus in the visual range of the vehicle driver to the side of or behind his immediate visual range. It may also preferably be located above the upper third, depending upon the purposes for which the additional vehicle driver's torso support device is provided.

For this reason alone this seat-free torso support region should be kept absolutely free at least in normal forward driving operation. Accordingly it should not be confused with a conventional torso support region in which for instance an arm rest device of a vehicle seat, on which the driver of the vehicle can then rest his arm for relief of stress, can be pivoted in temporarily. On the other hand, within the meaning of the invention the seat-free torso support region is located off-centre of the seat back part. Just for this reason it should not be confused with a conventional torso support region in which a back part extension device is placed, nor since the seat-free torso support region is also disposed in front of the seat back part and to the side thereof. In this respect the present seat-free torso support region is also provided above the seat part and to the side of the seat part of the vehicle seat.

The description "seated working posture oriented to the side or backwards" in this case describes an enforced posture of the driver of the vehicle relative to a rotation of the upper body, in order in this case to be better able to watch a rear working area, in particular behind the agricultural commercial vehicle, or to be better able to operate operating elements disposed laterally at the back.

It should be pointed out here that the vehicle seat according to the invention can be used not only with regard to a driver of the vehicle. Instead the vehicle seat according to the invention can be used in almost any field of application, in which an additional torso support device is to be provided at least temporarily in the surroundings of the vehicle seat.

The additional vehicle driver's torso support device can be used particularly easily if the additional vehicle driver's torso support device is disposed on the seat back part so that it can be actuated by means of a pressure-actuated device on an upholstered part of the seat back part, or also at any other location.

It will be understood that the additional vehicle driver's torso support device can be designed to be moved in structurally diverse ways. A first variant relating to this provides particularly advantageously that the additional vehicle driver's torso support device has a linear guide device for substantially horizontal movement of the additional vehicle driver's torso support device along the horizontal axis.

Use of the additional vehicle driver's torso support device may be configured particularly comfortably if the additional vehicle driver's torso support device has a spring-loaded linear guide device by means of which the additional vehicle driver's torso support device can be moved automatically.

It will be understood that a movement of the additional vehicle driver's torso support device can take place mechanically, hydraulically, pneumatically or even by means of electric motors, depending upon which technical prerequisites are available on the respective commercial vehicle.

In order also to be able to place the additional vehicle driver's torso support device outside to the side and/or in front of the seat back part, it is advantageous if the linear guide device has an adjustment path which extends laterally over the seat back part.

The additional vehicle driver's torso support device can be moved on a very direct path and thus advantageously in a space-saving manner into the otherwise seat-free torso support region if an adjustment path of the additional vehicle driver's torso support device is disposed substantially transversely with respect to a vertical adjustment path of the seat back extension device. In this respect, the adjustment path of the additional vehicle driver's torso support device differs from a conventional vertical adjustment path of a seat back extension device.

The additional vehicle driver's torso support device can be guided and retained along the adjustment path in a particularly stable manner if the linear guide device has rigid flat strip element guided and mounted on roller elements.

Such a rigid flat strip element can for example be produced very stably from metal, but also sufficiently stably from a plastic, wherein the latter can often be lighter and produce less noise when rolling.

The linear guide device preferably has at least four such roller elements, so that the flat strip element can be retained on the linear guide device so as to be particularly well supported or mounted respectively. It will be understood that fewer or more roller elements can be used if the linear guide device has additional support elements.

Cumulatively or alternatively the linear guide device may also comprise sliding surface means on which the flat strip element can slide along.

If the roller elements are disposed off-centre above the seat back part, an extraordinarily good introduction of forces from the additional vehicle driver's torso support device into the linear guide device can be ensured.

In this case actuation of the additional vehicle driver's torso support device preferably takes place by a corresponding elbow movement by the driver of the vehicle, in that the additional vehicle driver's torso support device is moved by means of the elbow into the additional torso support position in the otherwise seat-free torso support region. Movement back of the additional vehicle driver's torso support device ideally takes place by a manual impetus and with the aid of a spring force support.

In addition, an alternative but no less advantageous variant provides a seat back extension device which is disposed on the seat back part so as to be rotatable about a vertical axis in order to be able to move the additional vehicle driver's torso support device with an alternative design from an approximately central starting position into an off-centre additional torso support position. In this respect, the object of the invention is already achieved by this combination of features independently of the other features described here.

If the additional vehicle driver's torso support device is disposed on the seat back part so as to be rotatable about a vertical axis in order to be able to pivot the additional vehicle driver's torso support device from an approximately central starting position into an off-centre additional torso support position, a working area laterally surrounding the vehicle seat is at least not permanently blocked by the additional vehicle driver's torso support device.

Furthermore, it is advantageous if the additional vehicle driver's torso support device has an adjustment device for pivoting the additional vehicle driver's torso support device about a vertical axis, wherein the adjustment device comprises at least two different adjustment modes.

An advantageous variant provides that the adjustment device has an adjustment path with a first unlatched adjustment path section comprising an adjustment angle between 0° and 220°, preferably between 0° and 180°, wherein this is a first adjustment mode of the adjustment device. Such an unlatched adjustment path section enables a substantially unrestricted rapid adjustment in positions in which a torso support provision with regard to the additional vehicle driver's torso support device is not necessary. In this respect an advantageous first adjustment mode is provided.

If the adjustment device has as at least one further adjustment mode an adjustment path with at least one further latched adjustment path section comprising an adjustment angle between 220° and 290°, preferably between 180° and 270°, the additional vehicle driver's torso support device can be advantageously adapted to the requirements of the particular driver of the vehicle with regard to the off-centre additional torso support position. In this respect an advantageous second adjustment mode is provided.

The design of the present additional vehicle driver's torso support device can be further improved if the additional vehicle driver's torso support device has a first contact surface and a second contact surface for the driver of the vehicle, wherein the second contact surface substantially opposite the first contact surface is disposed on the additional vehicle driver's torso support device.

Advantageously, the torso support contour of the additional vehicle driver's torso support device is located in a normal torso support operating state of the vehicle seat at the back of the seat back extension device. Both contact surfaces are adapted to the anatomical and postural situation.

The additional vehicle driver's torso support device is advantageously disposed movably at the upper end of the seat back part, so that if appropriate the additional vehicle driver's torso support device can also be retrofitted to conventional vehicle seats. Moreover previously usual dimensions of a vehicle seat can also be maintained with regard to the vehicle seat according to the invention.

The object of the invention is also achieved by a commercial vehicle, in particular by an agricultural commercial vehicle, with a vehicle seat according to the invention for a driver of the vehicle according to one of the features described here.

A vehicle seat with the additional vehicle driver's torso support device according to the invention considerably relieves stress on the driver of a commercial vehicle.

Further advantages, aims and characteristics of the present invention are explained with reference to the appended drawings and the following description in which for example vehicle seats each having an additional vehicle driver's torso support device are illustrated and described. In the drawings:

BRIEF DESCRIPTION OF THE DRAWINGS

FIG. 1A shows schematically a perspective view of a vehicle seat located in a normal operating state with a seat part, with a seat back part, with an arm rest device and with a seat back part extension device comprising an additional vehicle driver's torso support device;

FIG. 1B shows schematically a rear detail view of the back extension device of FIG. 1A comprising the additional vehicle driver's torso support device;

FIG. 1C shows schematically a front view of the vehicle seat of FIGS. 1A and 1B in a special support operating state;

FIG. 1D shows schematically a rear side view of the vehicle seat of FIGS. 1A to 1C in the special support operating state;

FIG. 2A shows schematically a plan view of an alternative additional vehicle driver's torso support device again in the form of a seat back extension device both in a normal support operating state and in a special support operating state;

FIG. 2B shows schematically a front view of the vehicle seat of FIG. 2A in a normal support operating state;

FIG. 2C shows schematically a further front view of the vehicle seat of FIGS. 2A and 2B in the special support operating state;

FIG. 2D shows schematically a plan view of the vehicle seat of FIGS. 2A and 2C with illustrated adjustment path of the additional vehicle driver's torso support device.

DETAILED DESCRIPTION OF THE PREFERRED EMBODIMENTS

The vehicle seat 1 shown in FIGS. 1A to 1D for an agricultural commercial vehicle (not shown here) has a seat part 2, a seat back part 3 and seat back extension device 4 which is disposed centrally above the seat back part 3. In the forward driving position the vehicle seat 1 is fastened with the underside 7 of its seat part 2 by means of a bracket, which is not illustrated and optionally comprises a spring device, on a cab floor (not shown here) of the agricultural commercial vehicle.

According to the invention the vehicle seat 1 has outside the seat part 2 and the seat back part 3 an additional vehicle driver's torso support device 8 of particularly simple structural design in the form of the seat back extension device 4 which can be temporarily disposed at least partially in an otherwise seat-free torso support region 9 above and in front of the upper third (21) of the seat back part in front of the seat back part 3 and to the side of the seat back part (3), in order to provide support, laterally off-centre of the seat back part 3, at least at the level of the shoulder or chest region of the driver (not shown here) who is sitting on the vehicle seat 1 when he adopts a seated working posture oriented to the side or backwards.

In the illustration according to FIG. 1A the vehicle seat 1 is in a normal support operating state 11 and in the illustrations according to FIGS. 1C and 1D it is shown in each case in a special support operating state 12.

The additional vehicle driver's torso support device 8 can be moved in translation to the left 13 externally into an otherwise seat-free torso support region 9, in order to support the driver of the vehicle there particularly advantageously while he is in an enforced posture oriented to the side or backwards.

For this purpose, the additional vehicle driver's torso support device 8 has a linear guide device 15 (see in particular FIGS. 1B and 1D) which is supported by a retaining device 16 of the back extension device 4.

The retaining device 16 is retained on the seat back part 3 of the vehicle seat 1 in such a way that the back extension device 4 is adjustable in height along a vertical adjustment path 17 relative to the seat back part 3. In this respect in this embodiment the seat back extension device 4 can be optimally adapted by this means to the size of the driver of the vehicle. The retaining device 16 has two vertical struts 18 (only examples being identified by numerals here) which can be fastened with their lower ends 19 to a guiding device (not shown) within the seat back part 3. At the top the retaining device 16 has a horizontal strut 20 extending between the two vertical struts 18.

At the left 13 on the retaining device 16 and at the end of this horizontal 20 the linear guide device 15 is disposed in such a way that by it the seat back extension device 4 and thus also the additional vehicle driver's torso support device 8 is mounted on the seat back part 3 so as to be movable in translation along a geometric horizontal axis 21 in the direction of a transverse adjustment path 22 in order in particular to be able to move the additional vehicle driver's torso support device 8 horizontally from an approximately central starting position 25 (see FIG. 1A) in an off-centre additional torso support position 26 (see FIGS. 1C and 1D).

In this case the transverse adjustment path 22 extends substantially at right angles transversely with respect to the vertical adjustment path 17 and extends on the left 13 to laterally above the seat back part 3, so that the additional vehicle driver's torso support device 8 can be moved into the otherwise seat-free torso support region 9.

The linear guide device 15 comprises a roller retaining device 30 with four roller elements 31 (only examples being identified), wherein a rigid flat strip element 32 is guided thereon and can be moved along the geometric horizontal axis 21 in translation between the two support operating states 11 and 12.

The roller retaining device 30 is disposed at the top on the holding device 16 of the seat back part 3, wherein the individual roller elements 31 are disposed off-centre above the seat back part 3.

In this case two roller elements 31 which are spaced apart from one another along the horizontal axis 21 are each disposed on a first side of the rigid flat strip element 32, whilst two further roller elements 31 which are likewise spaced apart from one another along the horizontal axis 21 are each disposed on a second side of the rigid flat strip element 32, wherein the first side and the second side lie directly opposite one another.

The roller elements 31 each have a height along their axis of rotation which substantially corresponds to the width of the rigid flat strip element 32, so that the rigid flat strip element 32 is mounted in a particularly torsion-free manner on the roller retaining device 30.

In each case two roller elements which are directly opposite one another transversely with respect to the horizontal axis 21 are only spaced apart from one another by a narrow gap (not explicitly identified here) in such a way that the rigid flat strip element 32 is guided almost without a clearance between the relevant roller elements 31 in order to ensure close mounting of the flat strip element 32 on the roller retaining device 30.

All this contributes individually and in particular cumulatively to the additional vehicle driver's torso support device 8 being mounted on the vehicle seat 1 so as to be guided particularly well.

The rigid flat strip element 32 is fastened to a frame part 33 of the additional vehicle driver's torso support device 8 on which the rigid flat strip element 32 is also disposed.

The rigid flat strip element 32 also forms a wider transverse strut of the frame part 3, so that in this way the frame part 33 is immediately advantageously reinforced.

Furthermore, a reinforcing element 34 is also provided on the additional vehicle driver's torso support device 8 which advantageously reinforces the lower more flexible part of the additional vehicle driver's torso support device 8 in particular in the special support operating state 12.

The reinforcing element 34 is connected by its longer side 35 to the frame part 33 and by its shorter side 36 likewise to the frame part 33, wherein the reinforcing element 34 has a bend region 37 in order to produce a bent position 38.

Actuation of the additional vehicle driver's torso support device 8 takes place in this case by means of bodily force by an appropriate elbow movement by the driver of the vehicle, whereby with his right elbow or the back of his right upper arm region respectively he pushes the additional vehicle driver's torso support device 8 outwards into the otherwise seat-free torso support region 9. Resetting can be effected by means of an appropriate movement of the left elbow region. The necessary adjusting force is preferably chosen in such a way that the position of the additional vehicle driver's torso support device 8 can be maintained in almost any situation without negatively influencing an actuating force.

The additional vehicle driver's torso support device 8 may alternatively be activated by means of a pressure-actuated device (not shown in greater detail here) on an upholstered part 40 of the seat back part 3. This pressure-actuated device is preferably located on the seat back part side region 41 of the vehicle seat 1a facing away from the otherwise seat-free torso support region 9.

The alternative vehicle seat 101 shown in FIGS. 2A to 2D for an agricultural commercial vehicle (not shown here) has a seat part 102, a seat back part 103 and an arm rest device 105 (only shown in FIG. 2A) which is disposed on the left 113 laterally outside on the seat back part in relation to the forward driving direction 106 of the agricultural commercial vehicle. The vehicle seat 101 is fastened with the underside 107 of its seat part 102 by means of a bracket which is not shown here on a cab floor (not shown here) of an agricultural commercial vehicle.

The vehicle seat 101 has outside the seat part 102 and the seat back part 103 an additional vehicle driver's torso support device 108 which can be temporarily disposed at least partially in an otherwise seat-free torso support region 109 above and in front of the seat back part 103 in order to provide support, laterally off-centre of the seat back part 103, at least at the level of the shoulder region of the driver who is sitting on the vehicle seat 101 when he adopts a seated working posture oriented to the side or backwards, wherein the additional vehicle driver's torso support device 108 comprises a seat back extension device 104.

According to the invention in this embodiment the vehicle seat 101 comprises an additional vehicle driver's torso support device 108 which is fastened on the seat back part so as to be rotatable about a vertical axis 150. For this purpose, the additional vehicle driver's torso support device 108 is equipped with an adjustment device 151 which is disposed at the upper end 152 of the seat back part 103 so that the additional vehicle driver's torso support device 108 can be pivoted over an adjustment path 153 from an approximately central starting position 125 into a off-centre additional torso support position 126. The off-centre torso support position 126 is located in the otherwise seat-free torso support region 109.

Movement of the additional vehicle driver's torso support device 108 can take place particularly comfortably when the adjustment device 151 is spring-loaded. A tension spring element (not shown in this embodiment) which is suitable for this can be accommodated for example within the seat back part 103 and/or the seat back extension device 104.

In particular according to the illustration in FIG. 2A the additional vehicle driver's torso support device 108 is on the one hand shown disposed substantially behind the seat part 102 disposed in a normal support operating state 111 of the vehicle seat 101.

On the other hand, in a special torso support operating state 112 of the vehicle seat 101 the additional vehicle driver's torso support device 108 is advantageously moved into the otherwise seat-free torso support region 109 so that a driver of the vehicle (not shown here) sitting on the vehicle seat 101 is supported externally off-centre to the left 113 and to the side of the seat part 102, at least at the level of his shoulder region while he is in a seated working posture oriented to the side or backwards, as already described in the introduction.

In order to move the additional vehicle driver's torso support device 108 when the driver is sitting in a laterally twisted position, a pressure-actuated device (not shown here) in an upholstered part 140 of the seat back part 103 is actuated for instance by the driver's elbow so that the additional vehicle driver's torso support device 108 folds back.

In this case the additional vehicle driver's torso support device 108 rotates by means of the left rotary retaining element 154 of the adjustment device 151 and folds forwards again at the side of the seat back part 103 into the otherwise seat-free torso support region 109.

Thus, in this embodiment the additional vehicle driver's torso support device 108 is unlocked laterally here by means of arm pressure or the like in a seat back part side region 141 facing away from the otherwise seat-free torso support region 109 and is pivoted by means of a spring force by approximately 180° along the adjustment path 153. This is followed by latched adjustment options up to approximately 240°. With an overtravel of approximately 270° the additional vehicle driver's torso support device 108 falls back again into its central starting position, where it can engage with a right retaining element 155 (see FIG. 2B) again on the seat back part 103 and thus is again fixed in the central starting position 125. In this case the overtravel can take place manually.

The additional vehicle driver's torso support device 108 also has on the one hand a first contact surface 160 to assist a support function in the normal support operating state 111 and a second contact surface 161 to assist the additional torso support function in the special support operating state 112, wherein the second contact surface 161 substantially opposite the first contact surface 160 is disposed on the additional vehicle driver's torso support device 108. As a result the dual function of the seat back extension device 104 can be particularly advantageously configured.

In the normal support operating state 111 of the vehicle seat 101 the second contact surface 161 is disposed at the back of the seat back part 103. On the other hand, in the special support operating state 112 of the vehicle seat 101 it is facing the driver of the vehicle. Precisely the opposite happens with regard to the first contact surface 160.

By means of the rotatable back extension device 104 two torso support contours, namely on the one hand the first torso support surface 160 and on the other hand the second torso support surface 161, can be advantageously provided for optimal adaptation of contours in the two support operating states 111 and 112. In the normal support operating state 111 the driver of the vehicle has an optimal back support especially when he is in a driving posture facing forwards. When the driver of the vehicle is sitting in a laterally twisted position the back extension device 104 is used according to the invention as an additional vehicle driver's torso support device 108, so that the driver is optimally supported even in the seated working posture oriented backwards.

Pivoting of the back extension device 104 as an additional vehicle driver's torso support device 108 advantageously allows simultaneous use of a rear arm rest surface 165 optimised for comfort in the region of the seat back part 103 (see FIG. 2C) which is now free.

It will be understood that the embodiments explained above are merely first embodiments of the vehicle seat according to the invention. In this respect the disclosure of the invention is not limited to these embodiments.

Activation of the additional vehicle driver's torso support device preferably takes place in this case automatically and interactively by means of a bodily force exerted on the seat back part 3 and thus advantageously without an additional manually initiated actuation of operating elements, as described above. Operation of the additional vehicle driver's torso support device can also take place cumulatively or alternatively by means of operating elements which are ideally disposed in a left arm rest device.

All the features disclosed in the application documents are claimed as essential to the invention in so far as they are individually or in combination novel over the prior art.

LIST OF REFERENCE NUMERALS 1 vehicle seat
2 seat part
3 seat back part
4 seat back extension device
6 forward driving direction
7 underside
8 additional vehicle driver's torso support device
9 otherwise seat-free torso support region
11 normal support operating state
12 special support operating state
13 left
15 linear guide device
16 retaining device
17 vertical adjustment path
18 vertical struts
19 lower ends
20 horizontal strut
21 horizontal axis
22 transverse adjustment path
25 central starting position
26 off-centre additional torso support position 30 roller retaining device
31 roller elements
32 rigid flat strip element
33 frame part
34 reinforcing element
35 longer bar side
36 shorter bar side
37 bend region
38 bent position
40 upholstered part
41 seat back part side region facing away
101 alternative vehicle seat
102 seat part
103 seat back part
104 seat back extension device
105 arm rest device
106 forward driving direction
107 underside
108 additional vehicle driver's torso support device
109 otherwise seat-free torso support region
111 normal support operating state
112 special support operating state
113 left
125 central starting position
126 off-centre additional torso support position
140 upholstered part
141 seat back part side region facing away
150 vertical axis
151 adjustment device
152 upper end
153 adjustment path
154 left rotary retaining element
155 right rotary retaining element
160 first contact surface
161 second contact surface
165 rear arm rest surface

The invention claimed is:

1. A vehicle seat for a driver comprising:
a seat part having a seat back part for supporting a driver of the vehicle in a sitting position on the vehicle seat;
an additional vehicle driver's torso support device which can be disposed outside the seat part and the seat back part, and which can be temporarily disposed at least partially in a seat-free torso support region in front of the seat back part and laterally and above the seat back part, in order to provide support, laterally off-center of the seat back part, at least at a level of a shoulder region of the driver; and,
wherein the additional vehicle driver's torso support device includes a seat back extension device disposed on the seat back part, said seat back extension device having at least one horizontal strut such that the vehicle driver's torso support device is movable in translation along a horizontal axis corresponding to said horizontal strut of said seat back extension device to move the additional vehicle driver's torso support device substantially horizontally from an approximately central starting position into an off-center additional torso support position.

2. A vehicle seat as claimed in claim 1, wherein: the additional vehicle driver's torso support device has a linear guide device for horizontal movement of the additional vehicle driver's torso support device along the horizontal axis.

3. A vehicle seat as claimed in claim 2, wherein: the linear guide device has an adjustment path which extends laterally over the seat back part.

4. A vehicle seat as claimed in claim 3, wherein:
the linear guide device has a rigid flat strip element guided and mounted on roller elements.

5. A vehicle seat as claimed in claim 2, wherein: the linear guide device has a rigid flat strip element guided and mounted on roller elements.

6. A vehicle seat as claimed in claim 5, wherein: the roller elements are disposed off-center above the seat back part.

7. A vehicle seat as claimed in claim 1, wherein: the additional vehicle driver's torso support device has a spring-loaded linear guide device to facilitate automatic movement of the vehicle driver's torso support device.

8. A vehicle seat as claimed in claim 7, wherein: the linear guide device has an adjustment path which extends laterally over the seat back part.

9. A vehicle seat as claimed in claim 7, wherein:
the linear guide device has a rigid flat strip element guided and mounted on roller elements.

10. A vehicle seat as claimed in claim 1, wherein: an adjustment path of the additional vehicle driver's torso support device is disposed substantially transversely with respect to a vertical adjustment path of the seat back extension device.

11. A vehicle seat as claimed in claim 1, wherein: the additional vehicle driver's torso support device is disposed on the seat back part so as to be actuated by means of a pressure-actuated device on an upholstered part of the seat back part.

12. A commercial vehicle, in particular an agricultural commercial vehicle, having a vehicle seat as claimed in claim 1.

13. A vehicle seat for a driver comprising:
a seat part having a seat back part for supporting a driver of the vehicle in a sitting position on the vehicle seat;
an additional vehicle driver's torso support device which can be disposed outside the seat part and the seat back part, wherein the additional vehicle driver's torso support device can be temporarily disposed at least partially in a seat-free torso support region in front of the seat back part and laterally or above the seat back part in order to provide support, laterally off-center of the seat back part at least at a level of a shoulder region of the driver; and
wherein the additional vehicle driver's torso support device includes a seat back extension device disposed on the seat back part, said seat back extension device having at least one horizontal strut such that the additional vehicle driver's torso support device is movable in translation along a horizontal axis corresponding to said horizontal strut of said seat back extension device to move the additional vehicle driver's torso support device substantially horizontally from an approximately central starting position into an off-center additional torso support position.

14. A vehicle seat as claimed in claim 13, wherein: the additional vehicle driver's torso support device has a linear guide device for horizontal movement of the additional vehicle driver's torso support device along the horizontal axis.

15. A vehicle seat as claimed in claim 13, wherein: the additional vehicle driver's torso support device has a spring-loaded linear guide device to facilitate automatic movement of the vehicle driver's torso support device.

16. A vehicle seat as claimed in claim 13, wherein: an adjustment path of the additional vehicle driver's torso support device is disposed substantially transversely with respect to a vertical adjustment path of the seat back extension device.

17. A vehicle seat as claimed in claim 13 wherein: the additional vehicle driver's torso support device is disposed on the seat back part so as to be actuated by means of a pressure-actuated device on an upholstered part of the seat back part.

18. A commercial vehicle, in particular an agricultural commercial vehicle, having a vehicle seat as claimed in claim 13.

* * * * *